United States Patent [19]
Segawa

[11] Patent Number: 5,161,136
[45] Date of Patent: Nov. 3, 1992

[54] SERVO ERROR DETECTING METHOD OF AN OPTICAL DISC SYSTEM

[75] Inventor: Hideki Segawa, Sagamihara, Japan

[73] Assignee: Ricoh Company, Ltd., Tokyo, Japan

[21] Appl. No.: 323,301

[22] Filed: Mar. 14, 1989

[30] Foreign Application Priority Data

Mar. 14, 1988 [JP] Japan .................................. 63-59995

[51] Int. Cl.$^5$ ............................................ G11B 7/095
[52] U.S. Cl. .................................. 369/32; 369/44.34; 369/44.26
[58] Field of Search ............... 369/44.26, 44.32, 32, 369/44.34, 44.11; 360/78.01, 78.02

[56] References Cited

U.S. PATENT DOCUMENTS

| | | | |
|---|---|---|---|
| 4,428,075 | 1/1984 | Hazel | 369/44.26 |
| 4,488,278 | 12/1984 | Dieterich | 369/50 |
| 4,611,315 | 9/1986 | Ogino | 369/44.32 |
| 4,866,687 | 9/1989 | Kasai et al. | 369/44.11 |
| 4,872,152 | 10/1989 | Tsuyoshi et al. | 369/44.34 |
| 4,884,259 | 11/1989 | Horikawa et al. | 369/44.26 |
| 4,967,403 | 10/1990 | Ogawa et al. | 369/44.26 |

Primary Examiner—Roy N. Envall, Jr.
Assistant Examiner—Hindi Nabil
Attorney, Agent, or Firm—Cooper & Dunham

[57] ABSTRACT

An optical disc system includes an optical disc which is formatted to store data in sectors. A tracking error signal is monitored and if the tracking error signal exceeds a predetermined threshold level, the address information of a next sector following a target sector in which data is to be recorded or from which data is to be read out is read out. And, if the address information thus read out has been found to indicate an address which is consecutive to the address of the target sector, the occurrence of a tracking error is determined. On the other hand, if the address information thus read out has been found to indicate an address which is not consecutive to the address of the target sector, then the writing (recording) operation is terminated so as to prevent overwriting of data in an undesired sector.

7 Claims, 1 Drawing Sheet

Fig. 1
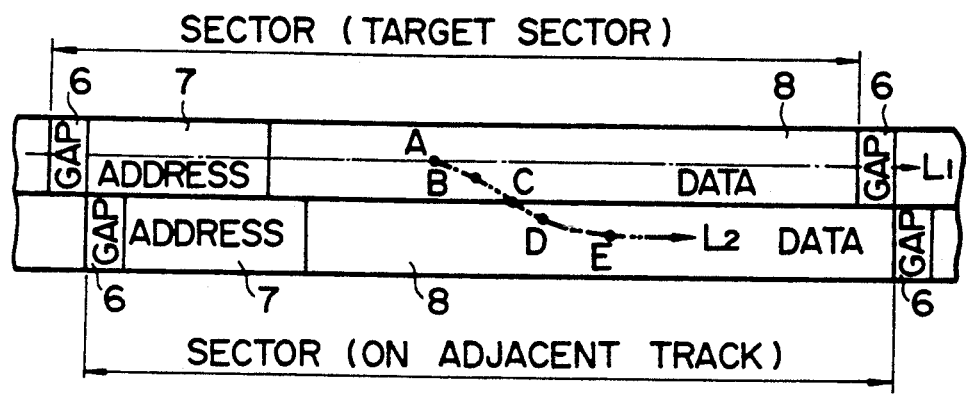
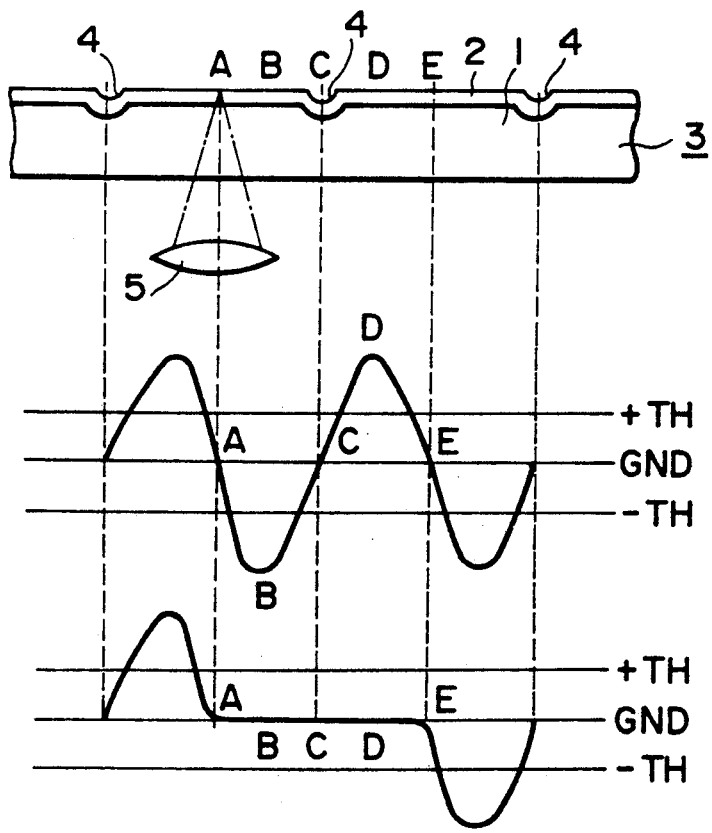
Fig. 2a
Fig. 2b
Fig. 2c

SERVO ERROR DETECTING METHOD OF AN OPTICAL DISC SYSTEM

BACKGROUND OF THE INVENTION

1. Field of the Invention

This invention generally relates to an optical disc system and in particular to a servo error detecting method in an optical disc system using an optical disc as a data storage device.

2. Description of the Prior Art

In general, an optical disc system uses an optical disc which can store a large amount of data, e.g., approximately 200-800 mega bytes in the case of an optical disc having a diameter of 5.25 inches. In such an optical disc, the track pitch is extremely small; it is of the order of 1.6 microns. And, in an optical disc drive, a fine tracking servo control operation is carried out so as to keep a laser beam accurately onto a single intended recording track of the optical disc. In order to carry out such a tracking control operation, an optical disc 3 includes a transparent substrate 1 having formed thereon a recording film 2 shown in FIG. 2a and guide grooves 4 are previously formed as spaced apart from each other in a radial direction to define a recording track between two adjacent ones of the guide grooves 4.

If a laser beam irradiated onto the optical disc 3 through an objective lens 5 is located at the center of a track T as indicated by a point A in FIG. 2a, i.e., at the center between the two adjacent guide grooves 4, a tracking error signal TrE will have a zero value as indicated by A in FIG. 2b. And, if the position of the laser beam spot on the optical disc 3 is shifted for example to a point B from the center of the track T, the tracking error signal TrE will have an amplitude value and a sign which depend on the magnitude of the shift and direction of the shift. A tracking servo operation is carried out so as to cause the tracking error signal to become zero. As shown in FIG. 1, a data format of the optical disc 3 is effected sector by sector, and each sector includes a gap section 6, an address section (including a flag section which contains sector management information) 7 and a data section 8.

When the user wishes to record data in a target sector of the optical disc 3 (write mode), it goes through the following process.

(1) PRE-READ (CHECK READ)

1-a) The correctness of the address of a target sector is checked by reading the address information of address section 7.

1-b) The presence of absence of a tracking error within a target sector is checked by a tracking error signal TrE.

(2) WRITE

A flag pit is written in the address section 7 of a target sector and data is written into the data section 8.

(3) VERIFY

Immediately after writing, the data is read out and it is checked whether or not the data has been written properly.

However, since the detection of tracking error, which corresponds to 1-b) of (1) above, is carried out by detecting a fluctuation in the tracking error signal TrE shown in FIG. 2b, inconveniences would arise, for example, when one or more guide grooves 4 are missing.

Described in greater detail in this respect, checking of tracking error during pre-read mode prior to an actual writing operation is important. Because, if a guide groove 4 is missing, the laser beam could be shifted away from the target sector into an adjacent sector in the adjacent track as indicated by the two-dotted line locus $L_2$ in FIG. 1 instead of following an intented locus indicated by $L_1$. If a writing operation is carried out under the circumstances, the data would be overwritten into the adjacent sector to thereby destroy the data which has been previously written in the adjacent sector.

In accordance with a prior art tracking error technique, a pair of tracking error detecting threshold levels $+TH$ and $-TH$ above and below a ground level GND of the tracking error signal TrE are used as shown in FIG. 2b, and if the tracking error signal TrE exceeds either of these threshold levels $+TH$ and $-TH$, i.e., at point B or D in FIG. 2b, it is determined that a tracking error has occurred, whereby it is determined not to use the current target sector during pre-read mode. However, in accordance with this tracking error detecting technique, if the guide groove 4, for example, at point C in FIG. 2a is missing (or produces an nonfluctuating TrE signal), the tracking error signal TrE will have a substantially flat portion as shown in FIG. 2c, though the laser beam is shifted into the adjacent sector in the adjacent track by following points in the order of A, B, C, D and E, so that this portion of the tracking error signal TrE would not exceed either of the thresholds $+TH$ and $-TH$. As a result, even if the laser beam has been shifted into the such a tracking error is not detected.

Such absence of a guide groove 4 could actually take place due for example to defects in the optical disc 1 and drop out of an exposure laser, such as Ar laser, during exposure of an original plate of disc stamper. The absence of a guide groove 4 is disadvantageous because it cannot detect off-tracking and it could result in overwriting of data in an undesired sector.

During reproduction, if servo signals, such as a tracking error signal and a focusing error signal, exceed a predetermined threshold level, a servo error condition is immediately determined and the reproduction operation is halted. However, even if a focusing error or tracking error condition has been detected after writing data, it might result from a defect on the optical disc 3 and not from any real focusing or tracking error condition. In such a case, if a servo error condition is immediately determined, there will be lost a chance to read data from the sector in question.

SUMMARY OF THE INVENTION

In accordance with the present invention, during recording of information in or reproducing information from a target sector, the address information of the next sector following the target sector is read out, and a servo error is detected depending on whether that address information is read out within a predetermined time period.

It is therefore a primary object of the present invention to obviate the disadvantages of the prior art as described above and to provide an improved servo error detecting method of an optical disc system.

Another object of the present invention is to provide an improved servo error detecting method which allows to prevent overwriting of data in an adjacent sector in an adjacent track due to off-tracking during writing mode from taking place.

A further object of the present invention is to provide an improved servo error detecting method capable of providing an enhanced data read out probability during reproduction mode.

Other objects, advantages and novel features of the present invention will become apparent from the following detailed description of the invention when considered in conjunction with the accompanying drawings.

BRIEF DESCRIPTION OF THE DRAWINGS

FIG. 1 is an illustration showing a sector structure of an optical disc; and

FIGS. 2a through 2c are illustrations which are useful for understanding the principle of the present invention.

DESCRIPTION OF THE PREFERRED EMBODIMENTS

In the first place, it should be noted that the present invention basically uses the principle of determining when a tracking error has occurred based on the fact whether or not the tracking error signal TrE has exceeded either one of thresholds +TH and −TH. In accordance with the present invention, in addition to such a scheme, an address continuity check is carried out to finally determine the occurrence of a tracking error. That is, during pre-read mode, a tracking error check is carried out and at the same time the address information of the next address section 7 which immediately follows a target sector in which data is desired to be written is read out. And, unless the address of the next following sector is properly read out within a predetermined time period, i.e., unless the consecutive sector addresses have been read out in sequence, it is determined that there is a possibility of causing a tracking error in that sector so that no writing operation is carried out.

Accordingly, even if no tracking error has been detected from the tracking error signal TrE because, for example, of missing of guide groove 4, if the address information of the next sector read out has been found to differ from the expected address information which follows the target sector, it is determined that a tracking error has, in fact, occurred. As a result, the probability of missing the occurrence of tracking error is significantly reduced and the danger of overwriting is minimized. Besides, since the occurrence of tracking error is also detected by the tracking error signal TrE, although the result of checking the address of the next following sector indicates a proper consecutive sector address as expected, if the tracking error signal TrE exceeds either of the threshold levels +TH and −TH, it is determined that a tracking error has occurred. Thus, a writing operation is prevented from taking place as being shifted away from the center of the track as indicated at point B in FIG. 1.

The present invention is also applicable to a focusing error condition. Upon occurrence of a focusing error, similarly with a tracking error, a focusing error signal similar to the tracking error signal TrE will exceed either of positive and negative threshold levels. When such a focusing error has occurred, the amplitude of the tracking error signal TrE decreases, and, as a result, either of the thresholds +TH and −TH would not be exceeded even if a tracking error has occurred. In addition, there is a possibility that the laser beam could return to the right track before the address section of the next following sector has been reached. Accordingly, according to the teachings of the present invention, a focusing error detecting operation may be advantageously carried out together with a tracking error detecting operation based on a tracking error signal and a continuous sector checking operation based on address information for checking the continuity of addresses. In this manner, a focusing error detecting operation can be carried out at high reliability. In this case, even if the result of checking of the address information of the next following sector indicates that it is the correct consecutive address, if the focusing error signal has been found to exceed one of the predetermined threshold levels, it is determined that a focusing error has actually occurred. With this scheme, a writing operation with a defocusing condition is prevented from taking place.

In addition, the present invention is also applicable to a data reproduction operation. That is, during reproduction mode, the occurrence of tracking error and/or focusing error is checked by examining the level of tracking error and/or focusing error signals. In accordance with the teachings of the present invention, even if these tracking and focusing error signals exceed the threshold levels, the occurrence of a servo error, i.e., tracking or focusing error, is not immediately determined. It is also checked whether or not the address information of the next sector following a target sector to be reproduced is properly read out within a predetermined time period. And, if such address information has not been properly read out, the occurrence of a servo error is determined and the reproduction operation is terminated. On the other hand, even if a servo error signal has been produced, if the address information of the next sector following the target sector has been read out correctly within a predetermined time period, that servo error signal is cancelled and the reproduction operation is carried out. Therefore, even if a servo error signal has been incorrectly produced, for example, due to a defect on the optical disc 3, such a faulty servo error signal is disregarded and data can be read out correctly. Thus, the correct data read out probability can be enhanced in accordance with the present invention.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A servo error detecting method of an optical disc system in which the disc has a track of consecutive sectors each of which includes a respective sector address identifying the sector, comprising the steps of:

reading the sector address of a target sector in which data is to be recorded or from which data is to be read out and the sector address of the next sector; and determining the occurrence of a servo error depending on whether or not the sector address read out within a predetermined time period after reading the sector address of the target sector identifies the sector which immediately follows the target sector along the track.

2. The method of claim 1 including deriving a tracking error signal and determining the occurrence of a servo error on the basis of said tracking error signal as well.

3. The method of claim 1 including deriving a focusing error signal and determining the occurrence of a servo error on the basis of said focusing error signal as well.

4. A method comprising the steps of:
providing a optical disc having sectors which are consecutively arranged along a track on the disc, where each sector includes a sector address;
reading out the sector address of a target sector on which data are to be recorded or from which data are to be read out;
reading out the next sector address; and
testing whether a servo error has occurred by determining if the next address read out within a selected time interval is the address of the sector which immediately follows the target sector along the track.

5. A method as in claim 4 including deriving a tracking error signal and determining if a servo error has occurred on the basis of said tracking error signal as well.

6. A method as in claim 5 including deriving a focusing error signal and determining if a servo error signal has occurred on the basis of said focusing error signal as well.

7. A method as in claim 4 including deriving a focusing error signal and determining if a servo error signal has occurred on the basis of said focusing error signal as well.

* * * * *